United States Patent [19]

Vandiver et al.

[11] 4,226,554
[45] Oct. 7, 1980

[54] METHOD AND APPARATUS FOR ABSORBING DYNAMIC FORCES ON STRUCTURES

[75] Inventors: John K. Vandiver, Lexington, Mass.; Shuhei Mitome, Kamakura, Japan

[73] Assignee: Massachusetts Institute of Technology, Cambridge, Mass.

[21] Appl. No.: 908,873

[22] Filed: May 23, 1978

[51] Int. Cl.² .................................................. E02B 1/00
[52] U.S. Cl. ..................................... 405/195; 52/168; 405/210
[58] Field of Search ................... 405/210, 195–209; 52/168

[56] References Cited
U.S. PATENT DOCUMENTS

| | | | |
|---|---|---|---|
| 3,665,721 | 5/1972 | Wyllie | 405/210 |
| 3,695,047 | 10/1972 | Pogonowski et al. | 405/210 |
| 3,779,024 | 12/1973 | Greve | 405/210 |
| 3,898,846 | 8/1975 | McCabe | 405/210 |
| 3,943,724 | 3/1976 | Banzoli et al. | 405/210 |

*Primary Examiner*—Dennis L. Taylor
*Attorney, Agent, or Firm*—Arthur A. Smith, Jr.; Paul J. Cook

[57] ABSTRACT

An apparatus and method is provided for suppressing the dynamic response of structures such as offshore structures to forces, such as that of wind, wave or seismic excitation. A storage tank for liquid with a free surface is positioned on the structure and is designed to have a natural frequency equal to or nearly equal to the natural frequency of the structure. The storage tank containing the liquid reduces the dynamic response of the structure thereby reducing structural degradation such as metal fatigue in the structure and increasing the useful life of the structure. The effect of the tank on the motion of the structure is that of a common dynamic absorber.

8 Claims, 5 Drawing Figures

METHOD AND APPARATUS FOR ABSORBING DYNAMIC FORCES ON STRUCTURES

BACKGROUND OF THE INVENTION

This invention relates to a method and apparatus for suppressing the dynamic response of fixed structures to wind, wave or seismic excitation, and under some circumstances, to machinery induced vibration as well.

For example, most fixed offshore structures, such as oil production platforms and light stations, have fundamental flexural and torsional natural frequencies of about 1.0 to 0.2 cycles per second (periods of 1.0 to 5.0 seconds). The natural frequencies are dependent upon the mass distribution and stiffness of the structure and not upon the wind and wave forces. These natural frequencies and occasionally higher mode natural frequencies are excited by random wind and wave forces. Accelerometers can be used to measure the platfrom response, and from the records, the natural frequencies can be determined.

The lowest frequencies of vibration of a structure are the flexural and rotational frequencies associated with the bending and twisting of the entire structure relative to the point of bottom attachment. These frequencies are important for structural reasons, because they are low enough to be driven by the higher-frequency components of the wind and wave spectra. Moreover, because they result in relatively large periodic motions of the entire structure, they represent a significant source of cyclic stress on the major supporting members, thereby decreasing their fatigue life.

The bending or rotational vibration of an offshore tower is usually determined by a low-frequency fundamental with occasional second- and even third-order frequencies superimposed. The lowest frequency usually dominates because it has more energy available from the wind and waves than do the higher-order modes and is therefore the only one of importance when making fatigue life estimates and when designing response suppressing devices. Accelerations caused by the fundamental modes are largest at the top of the tower, where it is relatively easy to find protected locations for the measurement transducers. In the case of a tower with a rectangular platform and symmetric mass distribution, the two flexural motions are parallel to the principal vertical planes of the structure and the rotational motion is about a vertical axis through the geometric center of the structure.

After having identified the significant natural frequencies of the offshore structure, it would be desirable to provide a means for maintaining the response of the structure to the natural forces to which it is exposed. Such a means would increase the life of the structure such as by minimizing the metal fatigue normally caused by the structure's dynamic response to the natural forces.

SUMMARY OF THE INVENTION

The natural frequency of the structure is determined by any conventional means such as by spectral analysis of acceleration response data recorded at selected locations near the top of the structure. Since liquid in storage tanks normally positioned on such structures affect the measured frequency of the structure, the natural frequency is determined when such tanks are empty. Damping of the liquid comes principally from viscous losses of the damping liquid on the walls of the tank. For a given liquid mass, the geometry of a tank suitable for holding the damping liquid is determined by equating the fundamental sloshing natural frequency of the tank with the structural natural frequency of interest. Tanks of suitable geometry are positioned at a location which experiences the largest structural motions, and oriented so that the sloshing of the liquid in the tank is excited by the motion of the structure. The tank is filled to the calculated depth and fine tuning is accomplished by small variations in the depth of the liquid. Optimum dynamic suppression properties may be achieved through fine tuning and by selection of a liquid with the appropriate viscosity.

DETAILED DESCRIPTION OF PREFERRED EMBODIMENTS

To put this invention into practice, certain minimum information must be provided. Because the literature pertaining to dynamic absorbers is in terms of mechanical mass, spring and damping elements, it is appropriate to describe the liquid absorber in terms of its mechanical equivalent. To do this, one must specify the equivalent mechanical mass of the liquid, its natural frequency and the damping of the mechanical equivalent system.

The Mechanical Equivalent to a Liquid Dynamic Absorber

The natural frequencies of a liquid in a tank, $\chi_n$, correspond to the natural frequencies of standing or sloshing waves on the surface. For simple geometries, such as rectangular and cylindrical tanks, these natural frequencies may be calculated. For more complex tank geometries, the natural frequencies are determined experimentally by conventional means such as model simulation. As will be presented below, there are theoretically an infinite number of such natural frequencies, but as a practical matter, only the first few are useful herein. A mechanical equivalent mass exists corresponding to each natural frequency, and for simple tank geometries, this mass may be calculated. The damping corresponding to each natural frequency or mode is most easily established experimentally, by exciting the mode of interest and then measuring the transcient decay. The damping depends on the viscosity of the liquid and the tank geometry. The rectangular tank will be used as an example because the expressions are easily derived. However, the principles are applicable to any tank with a free surface.

Equivalent Mechanical Mass

The total mass of the liquid in the tank $M_f$, is divided up into the n vibrating equivalent masses $m_n$, and a rigid body portion $m_o$ that moves rigidly with the tank.

$$M_f = \rho Lbh(kg), \text{ total mass} \quad \text{(Eq. 1)}$$

where,
$\rho$ = density of the liquid (kg/m³)
L,b = tank length and width (m)
h = liquid depth (m)

$$M_f = m_o + \sum_{n=1}^{\infty} m_n \text{ (kg)} \tag{Eq. 2}$$

where,
$m_n$ = vibrating equivalent mass for the nth mode
$m_o$ = rigid body equivalent mass $$m_n = M_f \frac{8\tanh\left[(2n-1)\frac{\pi h}{L}\right]}{\frac{\pi^3 h}{L}(2n-1)^3} \quad n = 1, \infty \tag{Eq. 3}$$

Equivalent Damping

For any liquid tank combination, the damping will depend on the viscosity of the liquid and the geometry of the tank. The fraction of critical damping, $\zeta_n$, for any particular standing wave mode may be determined experimentally by transient decay measurements. With this value, the equivalent mechanical dashpot constant may be found from the well-known relation:

$$c_n = 2\zeta_n \omega_n m_n \tag{Eq. 4}$$

The Equivalent Mechanical System

Figure 1:
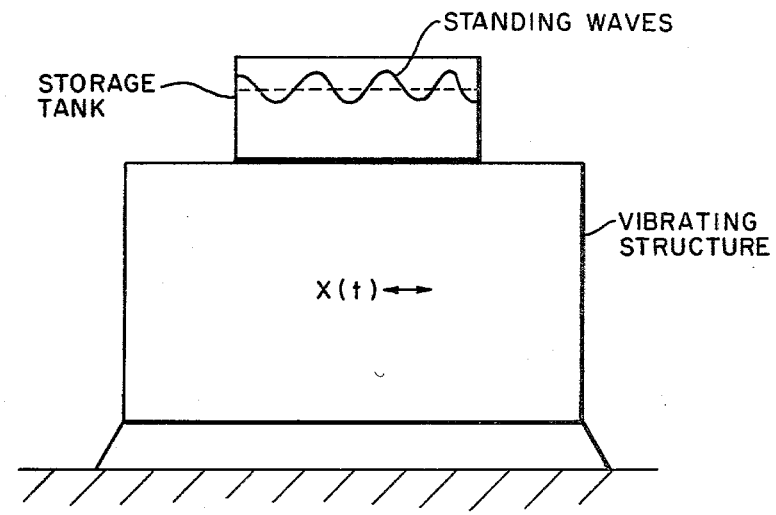
FIG. 1 shows a vibrating structure on top of which is shown a rectangular tank with a liquid with waves on its free surface.

FIG. 1, shows a vibrating structure on top of which is shown a rectangular tank with a liquid with waves on its free surface. In this case, the waves are excited by horizontal motions of the tank and will therefore suppress horizontal vibration. The same principles may be applied to suppress vertical vibrations, providing tank geometries are chosen that will generate standing waves in response to vertical excitation.

Figure 2:
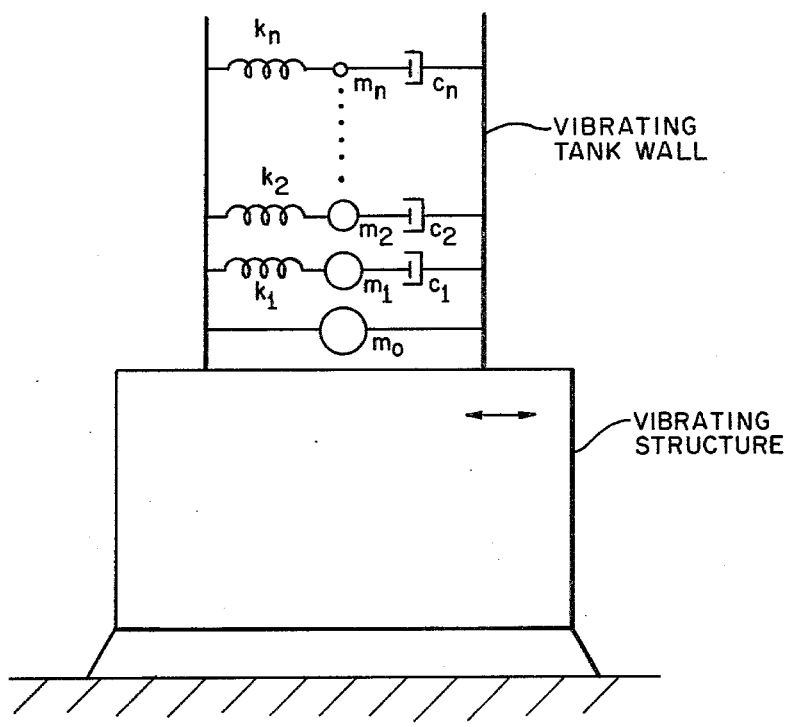
FIG. 2 shows the mechanical equivalent system of the system shown in FIG. 1.

FIG. 2 shows the mechanical equivalent system. The rigid body liquid mass $m_o$ is shown rigidly connected to the structure, and therefore $m_o$ must be added to the vibrating mass or modal mass of the structure, whichever is appropriate. The n equivalent masses are shown attached by springs and dashpots to the structure. It is not necessary to evaluate the spring constants, $k_n$, because they can be expressed in terms of $\omega_n$ and $m_n$ which are already known. One or more of these mass spring dashpot oscillators may be tuned to act as dynamic absorbers to the structural vibration. The response of the tuned oscillators will far exceed the others, and as a practical matter, are the only ones considered in evaluating the attenuation of the structural vibration.

Dynamic absorbers are most effective when the absorber mass is as large as possible. Therefore, in most applications, it is best to use the fundamental (i.e. n=1) mode of the tank, because it has the largest equivalent mass. The equivalent masses of the higher modes drop off as $1/n^3$ and are therefore far less useful as absorbers.

The following example illustrates the invention.

Figure 3A:
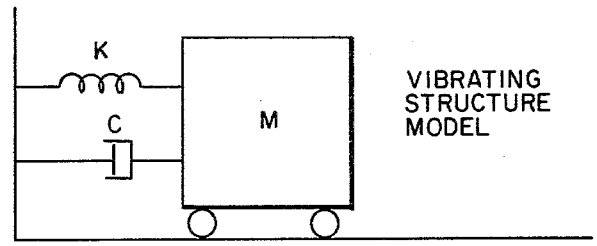
FIG. 3a shows a vibrating structure model.
Figure 3B:
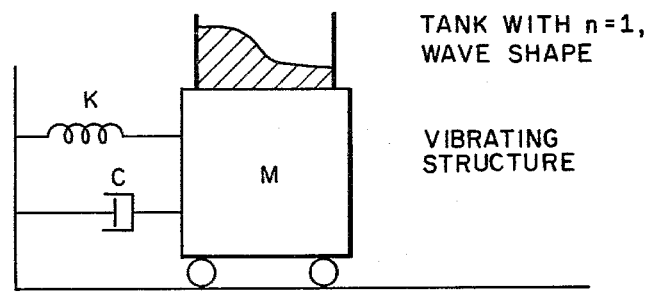
FIG. 3b shows the vibrating structure model of FIG. 3a with a tank containing a liquid.
Figure 3C:
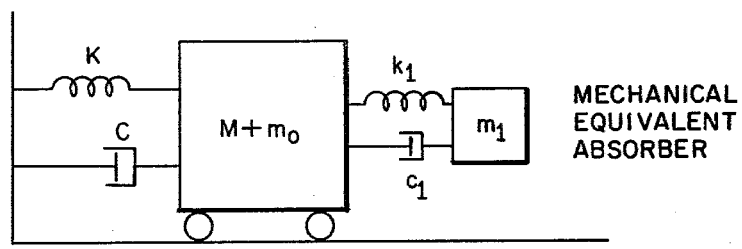
FIG. 3c shows the mechanical equivalent structure of that shown in FIG. 3b.

Assume that the vibrating structure is a single degree of freedom system as shown in FIG. 3a. The fundamental mode of the tank (i.e. n=1) is selected to perform as a dynamic absorber as shown in FIG. 3b. The mechanical equivalent system is shown in FIG. 3c where the necessary quantities are evaluated below.

$$\omega_1 = \left[\frac{\pi g}{L} \tanh\left(\frac{\pi h}{L}\right)\right]^{\frac{1}{2}} = \left(\frac{k_1}{m_1}\right)^{\frac{1}{2}} \tag{Eq. 5}$$

= natural frequency of 1st standing wave mode $$m_1 = \frac{8 M_f a}{\pi^3 h} \tanh\left(\frac{\pi h}{a}\right) \tag{Eq. 6}$$

$$m_o = M_f - \sum_{m_n} n = 1 \text{ to } \infty \tag{Eq. 7}$$

where the first few terms in the sum are adequate (e.g., n=1, to 6). The response of such a system is known to depend on the ratio of the uncoupled natural frequency of the absorber to the uncoupled natural frequency of the structure. The uncoupled natural frequency of the absorber in this example is given by Equation 6. The uncoupled natural frequency of the structure is given by $$\omega_s = \left[\frac{K}{M + m_o}\right]^{\frac{1}{2}} \tag{Eq. 8}$$

where it is important to note that the rigid body equivalent of the liquid must be added to the structural modal mass. Therefore, the ratio of the two frequencies is $$\Omega = \frac{\omega_1}{\omega_s} \tag{Eq. 9}$$

For most systems this ratio is near 1, but depends somewhat on the damping of the structure and absorber, and upon the ratio of absorber mass to structural mass. These relationships are well established in the literature as set forth for example in Den Hartog's "Mechanical Vibrations" which is incorporated herein by reference. The ratio of natural frequencies is normally adjusted until the optimum response properties are obtained. In this case, the natural frequency of the tank, and hence the ratio may be altered by changing the tank length and depth. The ratio is typically between about 0.8 and 1.1.

As mentioned above another important quantity is the ratio of absorber mass to structural modal mass. This is easily obtained by the following equation.

$$\mu = \frac{m_1}{M + m_o} \tag{Eq. 10}$$

The damping constants are also important and are determined experimentally for each application. However, dynamic absorber theory will specify the amount required in each application as set forth in Snowden, "Vibration and Shock in Damped Mechanical Systems" which is incorporated herein by reference. This may then be achieved by choosing a liquid of appropriate viscosity and/or by introducing baffles, screens, etc. in the tank.

With the above information and known dynamic absorber theory and practice, a functional free surface liquid dynamic absorber may be designed and utilized. This invention is essentially the recognition that liquids in tanks can be made to function as dynamic absorbers, and furthermore identified the information necessary to apply this technology. For simple geometries, the necessary information may be largely calculated, as in this example. For tanks of complex shape, the important quantities may be determined experimentally by model simulations. The exact tuning and selection of damping constants is as set forth for example in "Mechanical Vibrations", Den Hartog, McGraw-Hill, 1956 and "Vibration and Shock in Damped Mechanical Systems", Snowden, John Wiley & Sons, Inc., 1968.

This invention offers an alternative to the traditional mass spring dashpot dynamic absorbers, and is of particular value in circumstances where large liquid storage tanks are already required, as in buildings and offshore structures. Such tanks may now be configured to provide additional beneficial damping.

We claim:

1. In a fixed structure that exhibits a dynamic response to wind, water and/or seismic excitation, the improvement which comprises: means for damping said dynamic response comprising a storage tank containing a liquid with a free surface, said storage tank being positioned on and supported by said structure, the shape of said tank and the nature of the liquid being such as to effect a ratio of the uncoupled fundamental mode of the natural frequency of the tank containing liquid to the uncoupled fundamental mode of the natural frequency of the structure and the empty tank of between about 0.8 and 1.1.

2. The apparatus of claim 1 wherein said tank includes baffles to define the geometry of said tank.

3. The apparatus of claim 1 wherein said oscillating structure comprises a platform partially immersed in water.

4. The apparatus of claim 1 wherein said tank has a rectangular horizontal cross-section.

5. The method for damping the dynamic response of a fixed structure to wind, water and/or seismic excitation which comprises: determining the fundamental mode of the natural frequency of the structure having an empty storage tank for a liquid positioned thereon and regulating the geometry of said tank and the extent to which said tank is filled with a liquid so as to effect a ratio of the uncoupled fundamental mode of the natural frequency of the tank containing liquid to the uncoupled fundamental mode of the natural frequency of the structure and the empty tank of between about 0.8 and 1.1.

6. The method of claim 5 wherein the geometry of said tank is regulated with baffles positioned within said tank.

7. The method of claim 5 wherein said fixed structure is partially immersed in water.

8. The method of claim 5 wherein the geometry of said tank is regulated to have a rectangular horizontal cross-section.

* * * * *